(12) United States Patent
Gu et al.

(10) Patent No.: US 11,909,229 B2
(45) Date of Patent: Feb. 20, 2024

(54) WIRELESS POWER TRANSMISSION RECEIVING CIRCUIT, COMMUNICATION METHOD, AND WIRELESS POWER TRANSMISSION SYSTEM (71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Shouliang Gu, Foshan (CN); Kunren Yin, Foshan (CN); Yuanyang Zuo, Foshan (CN); Sanying Yu, Foshan (CN); Junfeng Hou, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 455 days.

(21) Appl. No.: 17/415,731

(22) PCT Filed: Dec. 5, 2019

(86) PCT No.: PCT/CN2019/123356
§ 371 (c)(1),
(2) Date: Jun. 18, 2021

(87) PCT Pub. No.: WO2020/125428
PCT Pub. Date: Jun. 25, 2020

(65) Prior Publication Data
US 2022/0069635 A1 Mar. 3, 2022

(30) Foreign Application Priority Data
Dec. 20, 2018 (CN) .......................... 201811577771.1

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS 8,547,057 B2 * 10/2013 Dunworth ............. H02J 7/0071
320/108
9,024,482 B2 * 5/2015 Kamata .................... H01F 38/14
307/104

(Continued)

FOREIGN PATENT DOCUMENTS

CN 101931250 A 12/2010
CN 202094868 U 12/2011

(Continued)

OTHER PUBLICATIONS

Canadian Office Action, Canadian Application No. 3,121,885, dated Jul. 25, 2022 (3 pages).

(Continued)

*Primary Examiner* — Adam D Houston (57) ABSTRACT

A wireless power transmission system includes: an electrical energy-receiving oscillation circuit including an electrical energy-receiving coil L2 and a compensation capacitor C2 connected in series, the electrical energy-receiving coil L2 sensing an alternating magnetic field and generating an induction current accordingly; a rectifier circuit connected to two ends of the electrical energy-receiving oscillation circuit; and a modulation circuit including multiple modulation sub-circuits, each of the modulation sub-circuits being separately connected to the electrical energy-receiving oscilla- (Continued)

tion circuit, and the modulation circuit receiving a drive signal used to select a modulation sub-circuit matching a power level of a load of the wireless power transmission receiving circuit to operate, and the modulation sub-circuits receive, during a communication process, a communication signal and load the communication signal on a carrier signal to perform modulation.

11 Claims, 7 Drawing Sheets

(56) References Cited

U.S. PATENT DOCUMENTS

| | | | |
|---|---|---|---|
| 11,309,741 B2* | 4/2022 | Mishima | H02M 7/53838 |
| 2005/0068019 A1 | 3/2005 | Nakamura et al. | |
| 2012/0025622 A1 | 2/2012 | Kim et al. | |
| 2013/0002034 A1* | 1/2013 | Onizuka | H02J 50/12 307/104 |
| 2014/0103869 A1* | 4/2014 | Radovic | H02J 50/60 320/108 |
| 2017/0353048 A1* | 12/2017 | Abidi | H02J 7/0048 |
| 2018/0138759 A1* | 5/2018 | Onishi | H02J 7/00 |
| 2019/0074721 A1* | 3/2019 | Cheng | H04B 5/0037 |
| 2021/0159738 A1* | 5/2021 | Yu | H02J 50/40 |
| 2021/0194268 A1* | 6/2021 | Jia | H02J 7/0071 |
| 2021/0408840 A1* | 12/2021 | Peralta | H02J 50/12 |
| 2021/0408844 A1* | 12/2021 | Peralta | H02J 50/80 |
| 2022/0069635 A1* | 3/2022 | Gu | H02J 50/12 |
| 2023/0087403 A1* | 3/2023 | Peralta | H02J 50/80 |
| 2023/0103414 A1* | 4/2023 | Xiao | H02M 7/06 320/108 |
| 2023/0163639 A1* | 5/2023 | Melone | H04B 1/16 307/104 |
| 2023/0283114 A1* | 9/2023 | Wadkar | H02J 50/20 307/104 |

FOREIGN PATENT DOCUMENTS

| | | |
|---|---|---|
| CN | 203434667 U | 2/2014 |
| CN | 104158304 A | 11/2014 |
| CN | 105162262 A | 12/2015 |
| CN | 105637373 A | 6/2016 |
| CN | 106921220 A | 7/2017 |
| CN | 108039894 A | 5/2018 |
| CN | 108075578 A | 5/2018 |
| CN | 108695956 A | 10/2018 |
| CN | 108702034 A | 10/2018 |
| CN | 108781094 A | 11/2018 |
| CN | 109687600 A | 4/2019 |
| CN | 109687600 B | 7/2021 |
| WO | 2020125428 A1 | 6/2020 |

OTHER PUBLICATIONS

The first office action of CN Application No. 201811577771.1, dated Apr. 3, 2019 (16 pages).
The second office action of CN Application No. 201811577771.1, dated Aug. 18, 2020 (15 pages).
The third office action of CN Application No. 201811577771.1, dated Jan. 29, 2021 (11 pages).
Notification to Grant Patent Right for Invention for CN Application No. 201811577771.1, dated Apr. 12, 2021 (4 pages).
International Search Report for PCT/CN2019/123356, dated Mar. 9, 2020 (14 pages).

* cited by examiner

WIRELESS POWER TRANSMISSION RECEIVING CIRCUIT, COMMUNICATION METHOD, AND WIRELESS POWER TRANSMISSION SYSTEM

CROSS-REFERENCES TO RELATED APPLICATIONS

The present disclosure is a national phase application of International Application No. PCT/CN2019/123356, filed on Dec. 05, 2019, which claims the foreign priority of Chinese Patent Application No. 201811577771.1, filed on Dec. 20, 2018 in the National Intellectual Property Administration of China, the entireties of which are herein incorporated by reference.

FIELD

This application relates to the field of wireless power transmission, and in particular to a wireless power transmission receiving circuit, a communication method and a wireless power transmission system.

BACKGROUND

Wireless power transmission (WPT) is safer and more convenient than wired methods, and may bring a good user experience to users. At present, wireless power transmission technology is widely used in the field of electric vehicles and cell phones, mainly using wireless methods for battery charging. There are also good application scenarios in the field of home appliances, and tail-free home appliances are the future development trend.

To ensure that the wireless power transmission transmitter may accurately control the power to the receiver, it is necessary to establish communication between the two. The existing wireless power transmission receiver has a high communication bit error rate with the wireless power transmission transmitter at different power states, and the problem needs to be solved urgently.

SUMMARY

The present disclosure provides an electronic device, a wireless power transmission receiving circuit, a communication method, and a wireless power transmission system to solve the problem of the high communication bit error rate between the wireless power transmission transmitter and the wireless power transmission receiver at different powers.

According to another embodiment of the present disclosure, a wireless power transmission receiving circuit is provided and includes an electrical energy-receiving oscillation circuit, including an electrical energy-receiving coil and a compensation capacitor connected in series, and the electrical energy-receiving coil may be configured to induct an alternating magnetic field to generate an induction current; a rectifier circuit, connected to two ends of the electrical energy-receiving oscillation circuit to rectify the induction current into a direct current, and may enable the direct current to flow to a load; a modulation circuit, including modulation sub-circuits, and each of the modulation sub-circuits may be respectively connected to the electrical energy-receiving oscillation circuit, the modulation circuit may be configured to receive a drive signal to select a modulation sub-circuit corresponding to a power level of the load of the wireless power transmission receiving circuit for operation, and during communication, the modulation sub-circuit may be configured to receive a communication signal and may load the communication signal on a carrier signal for modulation, The carrier signal is provided by the electrical energy-receiving oscillation circuit.

To solve the above-mentioned problem, another solution provided by the present disclosure is providing a wireless power transmission system. The wireless power transmission system includes a wireless power transmission transmitter circuit and the above-mentioned wireless power transmission receiving circuit.

To solve the above-mentioned problem, another embodiment provided by the present disclosure is providing an electronic device. The electronic device includes the above-mentioned wireless power transmission receiving circuit.

To solve the above-mentioned problem, another embodiment provided by the present disclosure is providing a communication method of the wireless power transmission receiving circuit. The method includes acquiring a current power level of the wireless power transmission receiving circuit; selecting one or more modulation sub-circuits corresponding to the power level of the wireless power transmission receiving circuit based on the current power level of the wireless power transmission receiving circuit.

The benefit of the present disclosure is that, being distinctive from current technology, the present disclosure discloses an electronic device, a wireless power transmission receiving circuit, and a communication method, and a wireless power transmission system. By setting multiple modulation sub-circuits, the multiple modulation sub-circuits are able to provide multiple modulation modes, so that the wireless power transmission receiving circuit has corresponding modulation sub-circuits to load the communication signal with the carrier signal at different power levels to reduce the error rate of the wireless power transmission transmitter circuit in the demodulation process, so that the wireless power transmission receiving circuit communicates to the wireless power transmission transmitter circuit with a low bit error rate and a good communication.

BRIEF DESCRIPTION OF THE DRAWINGS

In order to illustrate the embodiments of the present disclosure clearly, accompanying drawings for describing the embodiments will be introduced in brief. The drawings in the following description are only some embodiments of the present disclosure.

DETAILED DESCRIPTION OF THE DISCLOSURE

The present disclosure will be described clearly and thoroughly herein by referring to the accompanying drawings of the embodiments. Apparently, the embodiments described herein are only a part of, but not all of, the embodiments of the present disclosure.

In case of mentioning "first", "second", and the like, in an embodiment of the present disclosure, the "first", "second", and the like are only for description, and may not be understood as indicating or implying relative importance of a feature. The feature defined by "first", "second" may indicate or imply at least one of such feature being included. When the combination of the solutions contradicts each other or may not be implemented, the combination should be considered as non-existent and is not within the scope of the protection claimed by the present utility model.

References herein to "embodiment" may indicate that a particular feature, structure, or characteristic described in combination with an embodiment may be included in at least one embodiment of the present disclosure. The presence of the phrase in various sections of the specification may not indicate one same embodiment, or an embodiment that is mutually exclusive or alternative of other embodiments.

Figure 1:
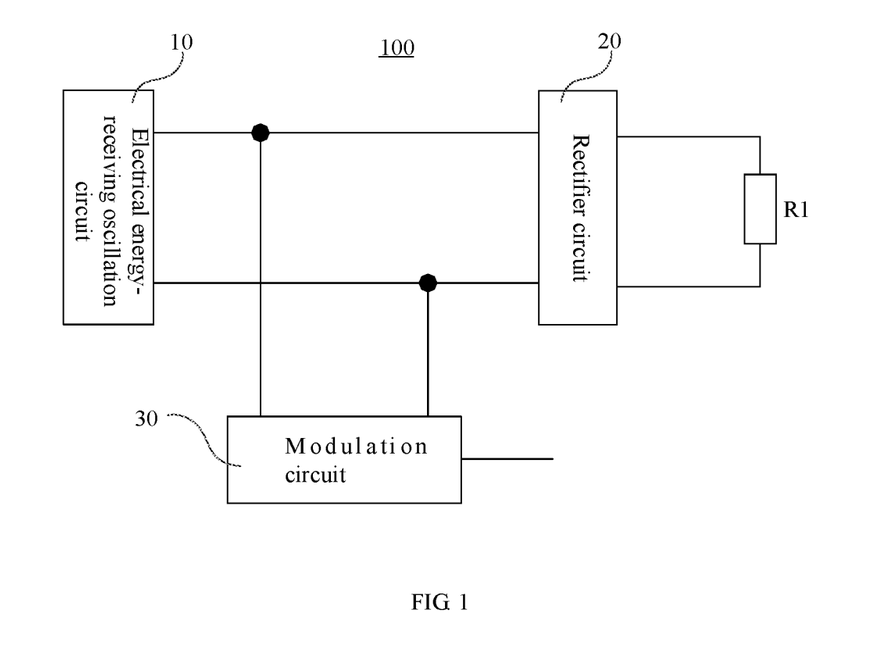
FIG. 1 is a schematic diagram illustrating a wireless power transmission receiving circuit according to a first embodiment of the present disclosure.

Referring to FIG. 1, FIG. 1 is a schematic diagram of the structure of a first embodiment of the wireless power transmission receiving circuit provided by the present disclosure.

Figure 5:
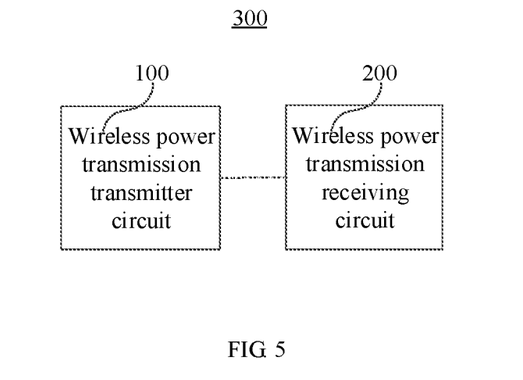
FIG. 5 is a schematic diagram illustrating a wireless power transmission system according to a first embodiment of the present disclosure.

Referring to FIG. 1 and FIG. 5, the wireless power transmission receiving circuit 100 may be configured to receive electrical energy sent from a wireless power transmission device or a wireless power transmission transmitter circuit 200, and may drive a corresponding modulation sub-circuit for operation, based on a power level of a load R1 of the wireless power transmission circuit 100. In this way, a communication signal and a carrier signal may be modulated into a modulated signal, and the modulated signal may be demodulated by the wireless power transmission circuit 200, and the communication signal may be acquired. The communication signal may at least be configured to trigger the wireless power transmission transmitter circuit 200 to adjust its own transmission power to meet a power demand of the load R1 of the wireless power transmission receiving circuit 100.

When the wireless transmission receiving circuit 100 takes a same modulation sub-circuit for modulation at various power demand levels, and a modulation capacitance value of the same modulation sub-circuit remains unchanged, a voltage change across an electrical energy-transmitting coil L1 in the wireless power transmission transmitter circuit 200 may vary significantly at various power levels. Therefore, an error rate of demodulating the modulated signal may be increased, resulting in a high communication error rate of the wireless power transmission receiving circuit 100 communicating with the wireless power transmission transmitter circuit 200.

That is, each power level of the wireless power transmission receiving circuit 100 may correspond to a unique modulation capacitance value. In this way, the wireless power transmission receiving circuit 100 may communicate with the wireless power transmission transmitter circuit 200 with a low communication error rate, having improved communication effect.

Further referring to FIG. 1, the wireless power transmission receiving circuit 100 may include an electrical energy-receiving oscillation circuit 10, a rectifier circuit 20, and a modulation circuit 30. The electrical energy-receiving oscillation circuit 10 may be configured to sense an alternating magnetic field generated by the electrical energy transmitting circuit 200, to generate a corresponding induction current. The induction current is an alternating current. The rectifier circuit 20 may be connected to two ends of the electrical energy-receiving oscillation circuit 10 for rectifying the induction current into a direct current, to provide the direct current to the load of the wireless power transmission receiving circuit 100. The modulation circuit 30 may be connected to the electrical energy-receiving oscillation circuit 10 for modulating the carrier signal in the electrical energy-receiving oscillation circuit 10 to load the communication signal with the carrier signal. The carrier signal, for example, may be a high-frequency voltage signal or a high-frequency current signal in the electrical energy-receiving oscillation circuit 10.

Figure 2:
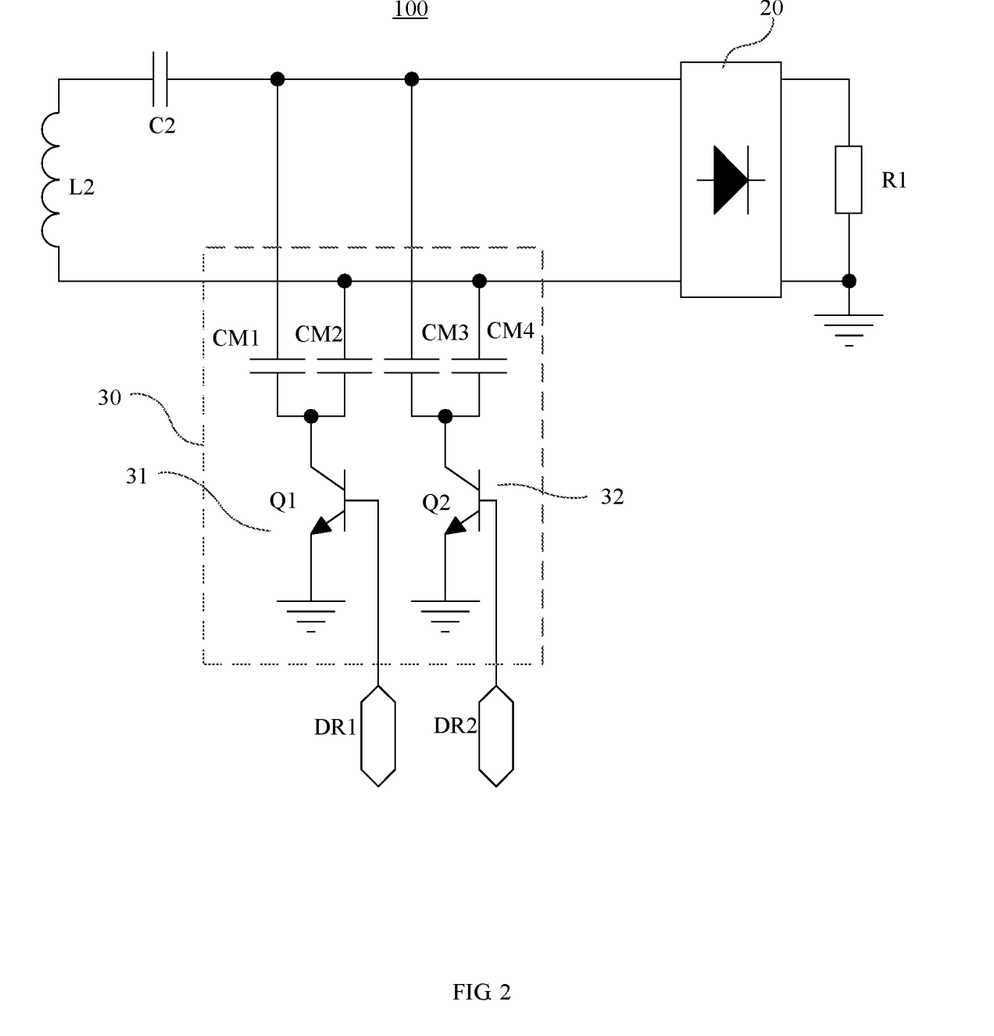
FIG. 2 is a schematic diagram illustrating a wireless power transmission receiving circuit according to a second embodiment of the present disclosure.

Referring to FIG. 2, the electrical energy-receiving oscillation circuit 10 may include an electrical energy-receiving coil L2 and a compensation capacitor C2 connected in series. The electrical energy-receiving coil L2 may be configured to sense the alternating magnetic field to generate the induction current.

The rectifier circuit 20 may be connected to one end of the electrical energy-receiving coil L2 and one end of the compensation capacitor C2, another two ends of the rectifier circuit 20 may be connected to two ends of the load R1.

The modulation circuit 30 may include multiple modulation sub-circuits (31, 32). Each of the modulation sub-circuits (31 or 32) may be connected to the electrical energy-receiving oscillation circuit 10. The modulation circuit 30 may be configured to receive a drive signal to select a modulation sub-circuit (31 or 32), which matches with the power level of the load of the wireless power transmission receiving circuit 100, to operate. In this way, the wireless transmission receiving circuit 100 meets a condition to communicate with the wireless transmission transmitting circuit 200, and the modulation sub-circuits (31, 32) may receive, during a communication process, the communication signal and load the communication signal on the carrier signal to perform modulation. The carrier signal may be provided by the electrical energy-receiving oscillation circuit 10.

The multiple modulation sub-circuits (31, 32) may provide various modulation manners, and the wireless transmission receiving circuit 100 may have one corresponding modulation sub-circuit or corresponding combination of multiple modulation sub-circuits (31, 32) for modulation at various power levels. In this way, the communication bit error rate for the wireless power transmission receiving circuit 100 communicating with the wireless power transmission transmitter circuit 200 may be low, and the communication effect may be better.

In one embodiment, the wireless power transmission receiving circuit 100 may select the corresponding modulation sub-circuit (31, 32) to operate based on a power value of the load R1. The modulation sub-circuit (31, 32) may correspond to a power value within a power range, and thus the wireless power transmission receiving circuit 100 may select the modulation sub-circuit (31, 32) to operate when the power value of the load R1 is within the power range.

In one embodiment, the communication signal may be configured to trigger the wireless power transmission transmitter circuit 200 to adjust its own transmission power to meet the power demand of the load R1 of the wireless power transmission receiving circuit 100.

In one embodiment, the communication signal may be configured to adjust a current frequency or a voltage frequency on the wireless power transmission transmitter circuit 200.

Figure 3:
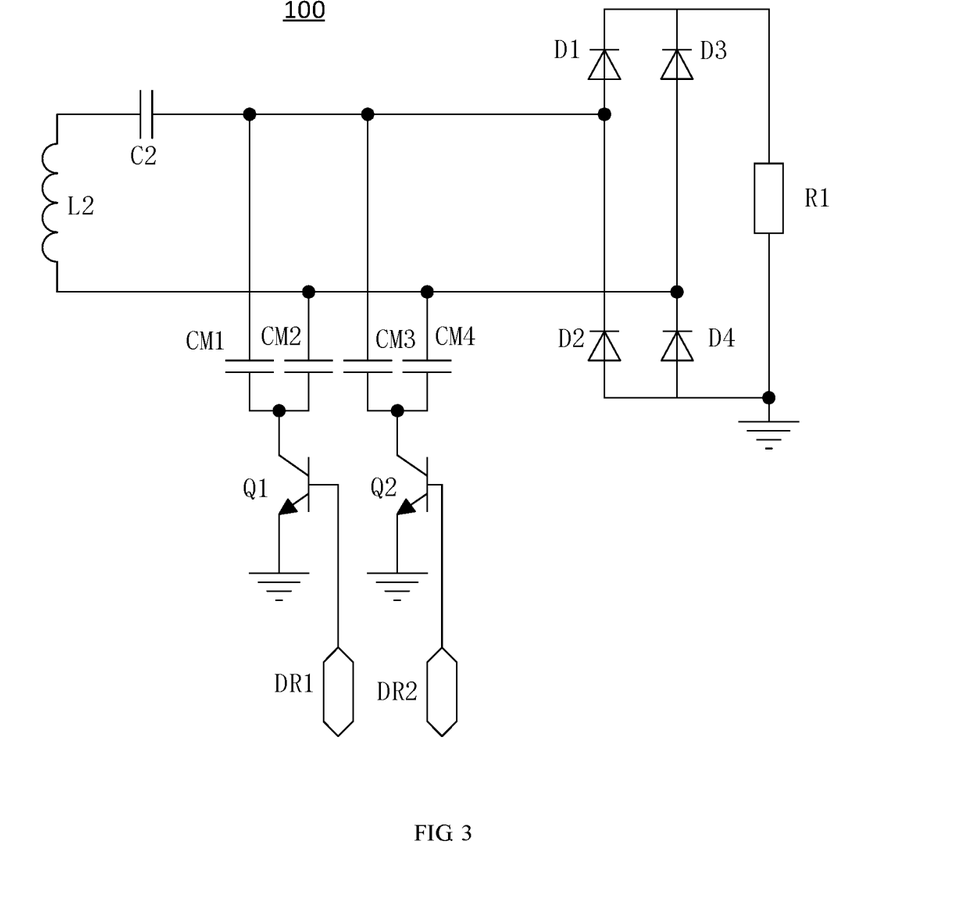
FIG. 3 is a schematic diagram illustrating a wireless power transmission receiving circuit according to a third embodiment of the present disclosure.

Referring to FIG. 3, in the present embodiment, the rectifier circuit 20 may include a first rectifier sub-circuit 21 and a second rectifier sub-circuit 22. The first rectifier sub-circuit 21 may include two diodes (D1, D2) connected in series. A node between the two diodes (D1, D2) of the first rectifier sub-circuit 21 may be connected to an output of the electrical energy-receiving oscillation circuit 10, and the other end of the node of the two diodes (D1, D2) of the first rectifier sub-circuit 21 may be respectively connected to two ends of the load R1. The second rectifier sub-circuit 22 may include another two diodes (D3, D4) connected in series. A node between the another two diodes (D3, D4) of the second rectifier sub-circuit 22 may be connected to another output of electrical energy-receiving oscillation circuit 10, and the other end of the node of the another two diodes (D3, D4) of the second rectifier sub-circuit 22 may be respectively connected to two ends of the load R1. One end of the load R1 may be connected to the ground.

Referring to FIG. 3, a second end of the load R1 may be connected to ground. When the induction current flowing through the electrical energy-receiving coil L2 is in an upper-half wave, the induction current may pass through the electrical energy-receiving coil L2 in a clockwise direction, flow into a first end of the load R1 through the diode D3, flow out of the load R1 from the second end of the load R1, and return to the electrical energy-receiving coil L2 through the diode D2.

In a next wave, when the induction current is in a lower-half wave, the induction current may pass through the electrical energy-receiving coil L2 in a counterclockwise direction, flow in the first end of the load R1 via the diode D1, flow out of the load R1 from the second end of the load R1, and return to the electrical energy-receiving coil L2 via the diode D4. Thus, the rectifier circuit 20 may rectify the induction current into the direct current and provide the direct current to the load R1.

Each of the modulation sub-circuits (31, 32) may include two modulation capacitors (CM1, CM2, or CM3, CM4) and a triode (Q1 or Q2). The two modulation capacitors (CM1, CM2, or CM3, CM4) connected in series may be connected in parallel with the electrical energy-receiving oscillation circuit 10, and a node between the two modulation capacitors (CM1, CM2, or CM3, CM4) may further be connected to a collector of the triode (Q1 or Q2). An emitting set of the triode (Q1 or Q2) may be connected to ground, and the base electrode (DR1, DR2) of the triode (Q1 or Q2) may be configured to receive the drive signal and the communication signal.

The two modulation capacitors (CM1, CM2, or CM3, CM4) of each modulation sub-circuits (31, 32) have a same capacitance value, and the modulation capacitor of any modulation sub-circuit may be different from the modulation capacitor of the other modulation sub-circuits.

In the present embodiment, the modulation circuit 30 may include a first modulation sub-circuit 31 and a second modulation sub-circuit 32. The first modulation sub-circuit 31 may receive a first signal drive, and the second modulation sub-circuit 32 may receive a second signal drive.

In response to the power level of the load R1 being a first level, the first drive signal drives the first modulation sub-circuit 31 to operate.

In response to the power level of the load R1 being a second level, the second drive signal drives the second modulation sub-circuit 32 to operate.

In response to the power level of the load R1 being a third level, the first drive signal drives the first modulation sub-circuit 31 to operate, and the second drive signal drives the second modulation sub-circuit 32 to operate.

In another embodiment, the modulation circuit 30 may include three, four, or five modulation sub-circuits. The present disclosure does not limit the number of modulation sub-circuits.

Taking the first modulation sub-circuit as an example, an operation process of modulation sub-circuit (31, or 32) may be illustrated, and a communication process between the wireless power transmission receiving circuit 100 and the wireless power transmission transmitter circuit 200 may be illustrated.

Continuing referring to FIG. 3, when the induction current flowing through the electrical energy-receiving coil L2 is in the upper-half wave, the induction current may pass through the electrical energy-receiving coil L2 in the clockwise direction, a first end of the modulation capacitor CM1 is connected to the ground through the diode D2. Therefore, the carrier signal on the electrical energy-receiving oscillation circuit 10 may not be modulated by the modulating capacitor CM1. In this situation, the carrier signal on the electrical energy-receiving oscillation circuit 10 may be modulated by the modulation capacitor CM2.

In the next wave, when the induction current is in the lower-half wave, the induction current may pass through the electrical energy-receiving coil L2 in the counterclockwise direction, a first end of the modulation capacitor CM2 may be connected to the ground through the diode D4, and the carrier signal on the electrical energy-receiving oscillation circuit 10 may be modulated by the modulation capacitor CM1.

That is, when the induction current on the electrical energy-receiving coil L2 is in the upper-half wave or the lower-half wave, the communication signal input through the collector DR1 of the triode Q1 may always be loaded onto the carrier signal through the corresponding modulation capacitor (CM1 or CM2).

For example, when the carrier signal may be a high-frequency voltage signal in the electrical energy-receiving oscillation circuit 10, an amplitude of the modulated voltage signal may change, and an amplitude of the transmitting voltage of the wireless power transmission transmitter circuit 200 may change through the electrical energy-receiving oscillation circuit 10 accordingly. The wireless power transmission transmitter circuit 200 may demodulate the transmitting voltage to acquire the communication signal, and perform an operation corresponding to the communication signal, such as adjusting the output power of the wireless power transmission transmitter 200 or adjusting the output frequency of the wireless power transmission transmitter circuit 200, and so on.

In one embodiment, when the carrier signal is a high-frequency current signal, after modulation, the current amplitude of the electrical energy-receiving oscillation circuit 10 may change, and the amplitude of the transmitting current of the wireless power transmission transmitter circuit 200 may change accordingly. The wireless power transmission transmitter circuit 200 may demodulate the transmitting current to acquire the communication signal and perform an operation corresponding to the communication signal.

Figure 4:
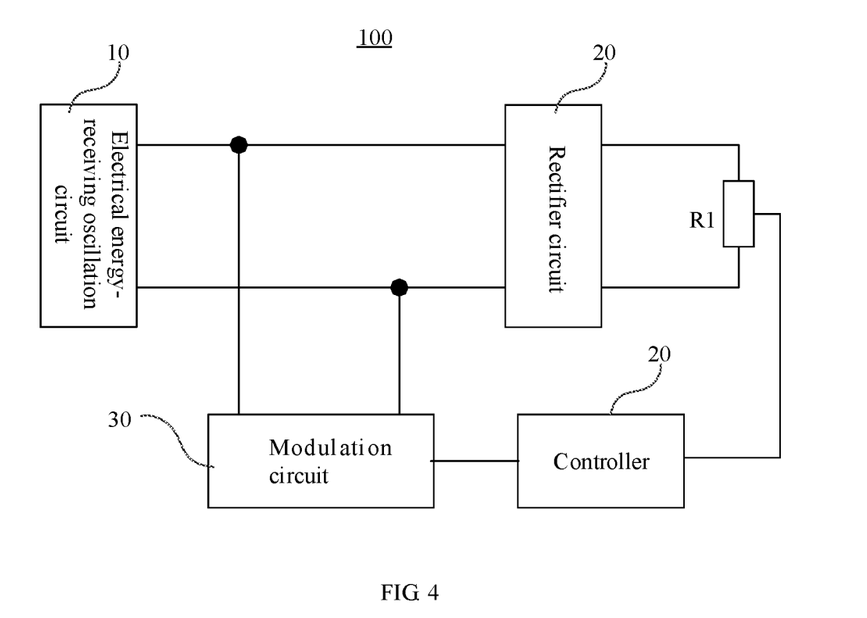
FIG. 4 is a schematic diagram illustrating a wireless power transmission receiving circuit according to a fourth embodiment of the present disclosure.

Furthermore, referring to FIG. 4, the wireless power transmission receiving circuit 100 may further include the controller 40. The controller 40 may be connected to the collector (DR1, DR2) of each of the modulation sub-circuits (31, 32). The controller 40 may acquire the power level of the load R1 and may select the corresponding modulation sub-circuit (31, 32) to send a communication signal. This means, the controller 40 may send the communication signal to the corresponding modulation sub-circuit (31 or 32). The modulation circuit 30 may receive the signal to select the corresponding modulation sub-circuit (31 or 32) to operate. That is, the communication signal may also serve as the drive signal to drive the modulation sub-circuit (31 or 32) to operate.

In one embodiment, the controller 40, for example, may be a Microcontroller Unit (MCU), a Central Process Unit (CPU) and the like.

For example, the load R1 may be a rechargeable battery. When power stored in the load R1 is less than 90% of saturated power, the power level of the load R1 may be determined as the first level, and the wireless power transmission transmitter circuit 200 may be required to provide higher transmission power to charge the rechargeable battery quickly. When the power stored in load R1 is greater than or equal to 90% of the saturated power but less than the saturated power, the power level of the load R1 may be determined as the second level, and the transmission power provided by the wireless power transmission transmitter circuit 200 may be reduced. When the power stored in the load R1 reaches the saturated power, the power level of the load R1 may be determined as the third level, and the transmission power provided by the wireless power transmission transmitter circuit 200 may meet the consumption of the wireless power transmission receiving circuit 100.

In one embodiment, the load R1 may be a rechargeable battery, and a power detector may be taken to detect the power stored in the load R1 to acquire the power level of the load R1 and provide a feedback of power level to the controller 40. The controller 40 may select the corresponding modulation sub-circuit (31, 32) to send a communication signal based on the power level of the load R1.

In one embodiment, the load R1 may be a power-consuming component, such as an electric motor, a compressor and the like. When the power level of the load R1 needs to be changed, a signal for adjusting the power of the load R1 may also be transmitted to the controller 40, and the controller 40 may select the corresponding modulation sub-circuit (31, 32) to send the communication signal based on the current power level of the load R1 to change the transmission power of the wireless power transmission transmitter circuit 200. Subsequently, the current power level of the load R1 may be changed. When communication is required, the controller 40 may select the modulation sub-circuit (31, 32) corresponding to the current power level of load R1 to send the communication signal.

In one embodiment, the load R1 may be a frequency-conversion energy-consuming component, such as an inverter compressor. When an operating frequency of the load R1 needs to be adjusted, a frequency adjustment signal of the load R1 may also be transmitted to the controller 40. The controller 40 may send the communication signal and load the communication signal with the carrier signal through the corresponding modulation sub-circuits (31, 32), and may communicate to the wireless power transmission transmitter circuit 200. The wireless power transmission transmitter circuit 200 may acquire the communication signal and adjust the transmission frequency correspondingly.

Referring to FIG. 5, FIG. 5 is a schematic diagram of the structure of the first embodiment of the wireless power transmission system provided by the present disclosure.

The wireless power transmission system may include the wireless power transmission transmitter circuit 200 and the wireless power transmission receiving circuit 100. The wireless power transmission receiving circuit 100 may receive the power transmitted by the wireless power transmission transmitter circuit 200. The wireless power transmission receiving circuit 100 may communicate to the wireless power transmission transmitter circuit 200.

For example, the wireless charging device may include a wireless power transmission transmitter circuit 200, and the electronic device may include the wireless power transmission receiving circuit 100. A position of the electronic device relative to the wireless charging device may be adjusted, and the electrical energy-receiving oscillation circuit 10 of the wireless power transmission receiving circuit 100 may be disposed at a position covered by the alternating magnetic field generated by the wireless charging device, and wireless charging may be performed. The electronic device may be, for example, an electric fan, an air conditioner, a cell phone and so on.

Figure 6:
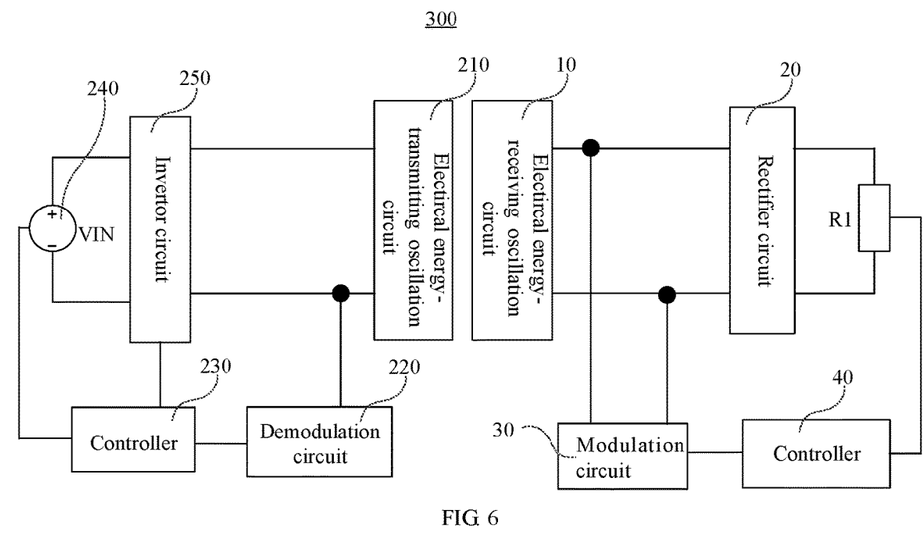
FIG. 6 is a schematic diagram illustrating a wireless power transmission system according to a second embodiment of the present disclosure.

Referring to FIG. 6, the wireless power transmission receiving circuit 100 may include the electrical energy-receiving oscillation circuit 10, the rectifier circuit 20, and the modulation circuit 30. The rectifier circuit 20 may be connected to two ends of the electrical energy-receiving oscillation circuit 10. The modulation circuit 30 may include multiple modulation sub-circuits (31, 32), and each of the modulation sub-circuits (31, 32) may be connected to the electrical energy-receiving oscillation circuit 10.

The wireless power transmission transmitter circuit 200 may include an electrical energy-transmitting coil 210, a demodulation circuit 220, and a controller 230. The electrical energy-transmitting coil 210 may be configured to receive the electrical energy to generate the alternating magnetic field to wirelessly charge the wireless power transmission receiving circuit 100. The demodulation circuit 220 may be connected to the electrical energy-transmitting coil 210 and demodulate the carrier signal of the electrical energy-transmitting coil 210 to acquire the communication signal. The controller 230 may be electrically connected to the demodulation circuit 220 for receiving the communication signal to adjust the output power of a power supply 240 on the wireless power transmission transmitter circuit 200. The controller 230 may adjust the output frequency of the power supply 240 on the wireless power transmission transmitter circuit 200 based on the received communication signal.

Figure 7:
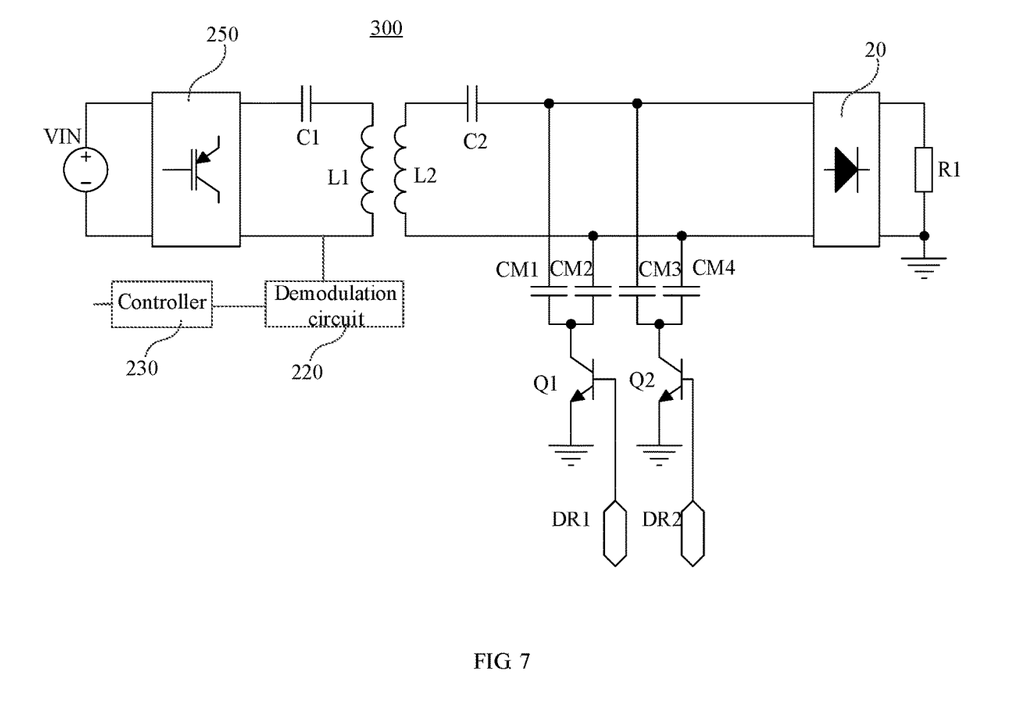
FIG. 7 is a schematic diagram illustrating a wireless power transmission system according to a third embodiment of the present disclosure.

Continuing referring to FIG. 7, the electrical energy-transmitting coil 210 may include an electrical energy-transmitting coil L1 and a capacitor C1 connected in series. A current may flow through the electrical energy-transmitting coil L1. The electrical energy-transmitting coil L1 may generate the alternating magnetic field, and the electrical energy-receiving coil L2 may induct the alternating magnetic field, and a corresponding induction current may be generated. The rectifier circuit 20 may rectify the induction current into the direct current, to provide the direct current to the load R1.

When the wireless power transmission receiving circuit 100 needs to communicate to the wireless power transmission transmitter circuit 200, the modulation circuit 30 may receive the drive signal to select a modulation sub-circuit (31, 32), which corresponds to the power level of the load R1 of the wireless power transmission receiving circuit 100, to operate. The modulation sub-circuit (31, 32) may receive the communication signal and load the communication signal with the carrier signal for modulation, and the amplitude of the carrier signal in the electrical energy-receiving oscillation circuit 10 may be changed, and the amplitude of the carrier signal in the wireless power transmission transmitter circuit 200 may be changed accordingly. The wireless power transmission transmitter circuit 200 may demodulate the modulated carrier signal to acquire the communication signal, and the communication signal may be configured to trigger the wireless power transmission transmitter circuit 200 to adjust the output power of the power supply to meet the power demand of the load R1.

The modulation sub-circuits (31, 32) may load the communication signal and the carrier signal for modulation, and the amplitude of the carrier signal in the electrical energy-receiving coil L2 may change (the carrier signal is modulated to form a first modulated signal), and the amplitude of the carrier signal in the electrical energy-transmitting coil L1 may be changed accordingly (a second modulated signal is formed). The demodulation circuit 220 may demodulate the modulated carrier signal (the second modulated signal) in the electrical energy-transmitting coil L1 to acquire the communication signal.

Referring to FIG. 7, in one embodiment, the power supply 240 may be a direct current power supply VIN. The wireless power transmission transmitter circuit 200 may further include an inverter circuit 250. The inverter circuit 250 may be connected between the direct current power supply VIN and the electrical energy-transmitting coil 210 for converting the direct current provided by the direct current power supply VIN into the alternating current and providing the alternating current to the electrical energy-transmitting coil 210.

In one embodiment, the controller 230 may be connected to the direct current power supply VIN to adjust an output power of the direct current power supply VIN based on the acquired communication signal.

In one embodiment, the controller 230 may be connected to the inverter circuit 250. The controller 230 may adjust a frequency of the alternating current provided by the inverter circuit 250 based on the acquired communication signal.

In another embodiment, the power supply 240 may be an alternating current power supply. The power supply 240 may be connected to two ends of the electrical energy-transmitting coil 210. The controller 230 may adjust the output power and/or an output frequency (the frequency of the current or the voltage) of the power supply 240 based on the acquired communication signal.

The controller 230 may also achieve other functions based on the acquired communication signal. For example, the controller 230 may control a signal light on the wireless power transmission transmitter circuit 200 to be turned on to signify that the wireless power transmission transmitter circuit 200 is in an external charging state. The present disclosure does not limit the specific functions that the controller 230 may achieve based on the acquired communication signal.

The demodulation circuit 220 and the inverter circuit 250 may be circuits understood and commonly used, and will not be repeated in the present disclosure.

The controller 240, for example, may be a MCU, a CPU and the like. The present disclosure does not limit specific selection of the controller 240, as long as the controller meets conditions for using the wireless power transmission transmitter circuit 200.

Figure 8:
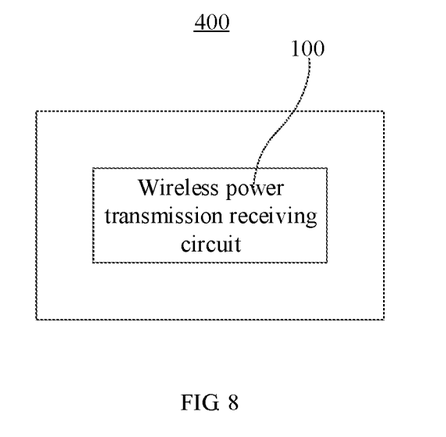
FIG. 8 is a schematic diagram illustrating an electronic device according to an embodiment of the present disclosure.

Referring to FIG. 8, FIG. 8 is a schematic diagram of the structure of a first embodiment of the wireless power transmission system of the present disclosure.

The electronic device 400 may include the wireless power transmission receiving circuit 100 mentioned above.

The electronic device 400 may be, for example a smart phone, an air conditioner, a fan and so on, to perform wireless charging and communication with devices such as wireless chargers through the wireless power transmission receiving circuit 100.

The wireless power transmission receiving circuit 100 is described in details in the above embodiments and will not be repeated in the present embodiment.

Figure 9:
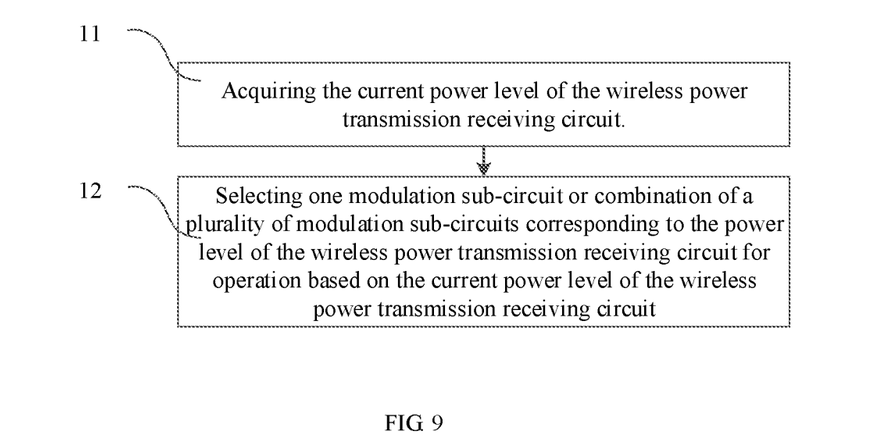
FIG. 9 is a flow chart illustrating a communication method of a wireless power transmission receiving circuit according to an embodiment of the present disclosure.

Referring to FIG. 9, FIG. 9 is a flow chart of an embodiment of the communication method of the wireless power transmission receiving circuit of the present disclosure.

In an operation 11: a current power level of the wireless power transmission receiving circuit may be acquired.

Acquiring the current power level of the wireless power transmission receiving circuit 100 may be considered as acquiring a current power level of the load R1 in the wireless power transmission receiving circuit 100.

For example, the load R1 may automatically send a power level signal to the controller 40. In one embodiment, the controller 40 may detect the power level of the load R1 and thus classify the current power level of the load R1 based on the magnitude of the power value of the load R1. That is, when the current power value of the load R1 is in a power value range, such as 0~2 KW, the controller 40 may classify the current power level of the wireless power transmission receiving circuit 100 as the first level; when the current power value of the load R1 is in another power value range, such as 2 KW~5 KW, the controller 40 may classify the current power level of the wireless power transmission receiving circuit as the second level, and so on.

In an operation 12: based on the current power level of the wireless power transmission receiving circuit, one modulation sub-circuit or combination of more than one modulation sub-circuits corresponding to the power level of the wireless power transmission receiving circuit may be selected to operate.

Based on the current power level of the wireless power transmission receiving circuit 100, one modulation sub-circuit or combination of more than one modulation sub-circuits (31, 32) corresponding to the power level of the wireless power transmission receiving circuit 100 may be selected to operate.

The wireless power transmission receiving circuit 100 may include the modulation circuit 30, and the modulation circuit 30 may include multiple modulation sub-circuits (31, 32). Each of the modulation sub-circuits (31, 32) may be connected to the electrical energy-receiving oscillation circuit 10, and the modulation sub-circuits (31, 32) may be configured to receive the communication signal and load the communication signal with the carrier signal for modulation.

The carrier signal may be provided by the electrical energy-receiving oscillation circuit 10.

The multiple modulation sub-circuits (31, 32) may provide multiple modulation methods, so that the wireless power transmission receiving circuit 100, at different power levels, may have a corresponding modulation sub-circuit or corresponding combination of more than one modulation sub-circuits (31, 32) for modulation. In this way, the wireless power transmission receiving circuit 100 may communicate to the wireless power transmission transmitter circuit 200 with a low communication bit error rate, having a better communication effect.

For example, the controller 40 may drive the corresponding modulation sub-circuits (31, 32) to operate based on the current power level of the wireless power transmission receiving circuit 100.

Figure 10:
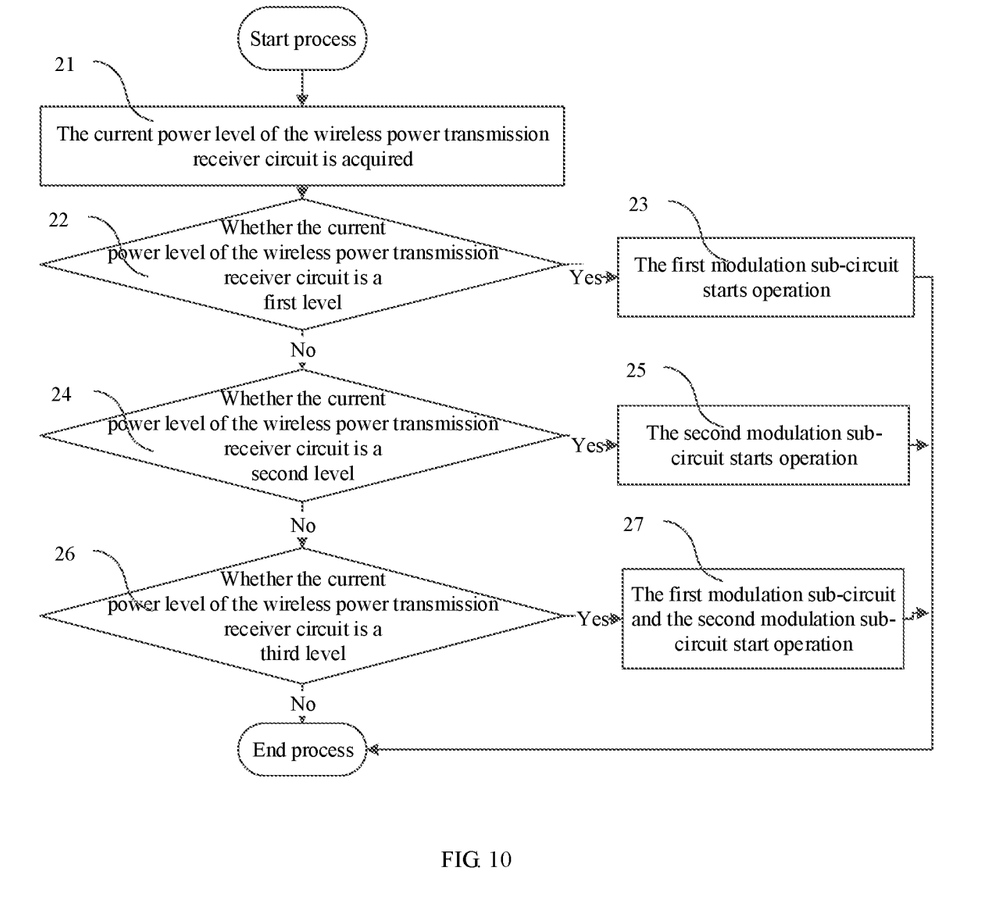
FIG. 10 is a flow chart illustrating a communication method of a wireless power transmission receiving circuit according to another embodiment of the present disclosure.

Referring to FIG. 10, a flow chart of the communication method of the wireless power transmission receiving circuit according to another embodiment of the present disclosure is provided.

The wireless power transmission receiving circuit 100 may include a first modulation sub-circuit 31 and a second modulation sub-circuit 32. The first modulation sub-circuit 31 may be configured to receive a first drive signal, and the second modulation sub-circuit 32 may be configured to receive a second drive signal.

In an operation 21: the current power level of the wireless power transmission receiving circuit may be acquired.

In an operation 22: it may be determined whether the current power level of the wireless power transmission receiving circuit is the first level.

It may be determined whether the current power level of the wireless power transmission receiving circuit 100 is the first level. In response to the current power level of the wireless power transmission receiving circuit 100 being the first level, an operation 23 may be performed. In response to the current power level of the wireless power transmission receiving circuit 100 being not the first level, an operation 24 may be performed.

In the operation 23: the first modulation sub-circuit may be initiated for operation.

In one embodiment, the first drive signal may drive the first modulation sub-circuit 31 to operate. The first drive signal may be sent by the controller 40. Subsequently, the first modulation sub-circuit 31 may terminate the operation.

In the operation 24: it may be determined whether the current power level of the wireless power transmission receiving circuit is the second level.

It may be determined whether the current power level of the wireless power transmission receiving circuit 100 is the second level. In response to the current power level of the wireless power transmission receiving circuit 100 being the second level, an operation 25 may be performed. In response to the current power level of the wireless power transmission receiving circuit 100 being not the second level, an operation 26 may be performed.

In the operation 25, the second modulation sub-circuit may be initiated for operation.

In one embodiment, the second drive signal may drive the second modulation sub-circuit 32 to operate. The second drive signal may be sent by the controller 40.

In the operation 26: it may be determined whether the current power level of the wireless power transmission receiving circuit is the third level.

It may be determined whether the current power level of the wireless power transmission receiving circuit 100 is the third level. In response to the current power level of the wireless power transmission receiving circuit 100 being the third level, an operation 27 may be performed. In response to the current power level of the wireless power transmission receiving circuit 100 being not the third level, the process may be terminated.

In response to the current power level of the wireless power transmission receiving circuit 100 being not any of the first level, the second level, and the third level, the wireless power transmission receiving circuit 100 may terminate the process and issue a warning message to alert the user. In one embodiment, the wireless power transmission receiving circuit 100 may be shut down to avoid damaging the wireless power transmission receiving circuit 100.

In the operation 25: the first modulation sub-circuit and the second modulation sub-circuit may be initiated for operation.

The first drive signal may drive the first modulation sub-circuit 31 to operate, and the second drive signal may drive the second modulation sub-circuit 32 to operate.

In response to the current power level of the wireless power transmission receiving circuit 100 changing, the controller 40 may reselect the corresponding one modulation sub-circuit or the corresponding combination of more than one modulation sub-circuits (31, 32) to operate.

The present disclosure discloses a wireless power transmission receiving circuit, a wireless power transmission system, and an electronic device. By setting multiple modulation sub-circuits, the multiple modulation sub-circuits are able to provide multiple modulation methods, so that the wireless power transmission receiving circuit having corresponding modulation sub-circuits to load the communication signal and the carrier signal at different power levels to reduce the error rate of the wireless power transmission transmitter circuit in the demodulation process, so that the wireless power transmission receiving circuit communicates to the wireless power transmission transmitter circuit with a low bit error rate and a good communication effect.

What is claimed is:

1. A wireless power transmission receiving circuit, comprising:
    an electrical energy-receiving oscillation circuit, comprising an electrical energy-receiving coil and a compensation capacitor connected in series, wherein the electrical energy-receiving coil is configured to induct an alternating magnetic field to generate an induction current;
    a rectifier circuit, connected to a first and second end of the electrical energy-receiving oscillation circuit to rectify the induction current into a direct current, enabling the direct current to flow to a load;
    a modulation circuit, comprising a plurality of modulation sub-circuits, wherein each of the plurality of modulation sub-circuits is respectively connected to the electrical energy-receiving oscillation circuit, the modulation circuit is configured to receive a drive signal to select a modulation sub-circuit corresponding to a power level of the load of the wireless power transmission receiving circuit for operation, and during communication, the modulation sub-circuit is configured to receive a communication signal and load the communication signal on a carrier signal for modulation,
    wherein the carrier signal is provided by the electrical energy-receiving oscillation circuit.

2. The wireless power transmission receiving circuit according to claim 1, wherein each of the plurality of modulation sub-circuits comprises two modulation capacitors and a triode, the two modulation capacitors are connected in series and further connected to the electrical energy-receiving oscillation circuit in parallel, a node between connected ends of the two modulation capacitors is connected to a collector of the triode, an emission set of the triode is connected to the ground, the drive signal and the communication signal are received by a base electrode of the triode;

two modulation capacitors of each of the modulation sub-circuits have a same capacitance value, and the two modulation capacitors of one of the plurality of the modulation sub-circuits are different from those of another one of the plurality of the modulation sub-circuits.

3. The wireless power transmission receiving circuit according to claim 2, wherein the modulation circuit comprises a first modulation sub-circuit and a second modulation sub-circuit, the first modulation sub-circuit is configured to receive a first drive signal, and the second modulation sub-circuit is configured to receive a second drive signal;

when the power level of the load is a first level, the first drive signal is configured to drive the first modulation sub-circuit to operate; when the power level of the load is a second level, the second drive signal is configured to drive the second modulation sub-circuit to operate; when the power level of the load is a third level, the first drive signal is configured to drive the first modulation sub-circuit to operate and the second signal driving to drive the second modulation sub-circuit to operate.

4. The wireless power transmission receiving circuit according to claim 1, wherein the rectifier circuit comprises:

a first rectifier sub-circuit, comprising two diodes connected in series, wherein a node between the two diodes of the first rectifier sub-circuit is connected to an output of the electrical energy-receiving oscillation circuit, and a first end of each of the two diodes is connected to two ends of the load respectively;

a second rectifier sub-circuit, comprising another two diodes connected in parallel, wherein a node between the another two diodes of the second rectifier sub-circuit is connected to the first end of the electrical energy-receiving oscillation circuit, and a second end of each of the another two diodes is connected to the two ends of the load respectively;

wherein one end of the load is connected to ground.

5. A wireless power transmission system comprising a wireless power transmission transmitter circuit according to claim 1, wherein the wireless power transmission receiving circuit is configured to receive electrical energy transmitted from the wireless power transmission transmitter circuit.

6. The wireless power transmission system according to claim 5, wherein the wireless power transmission transmitter circuit comprises:

an electrical energy-transmitting oscillation circuit, configured to receive the electrical energy to generate the alternating magnetic field to wirelessly charge the wireless power transmission receiving circuit;

a demodulation circuit, connected to the electrical energy-transmitting oscillation circuit, configured to demodulate the carrier signal of a electrical energy-transmitting circuit to acquire the communication signal;

a controller, electrically connected to the demodulation circuit, configured to receive the communication signal to adjust an output power of a power of the wireless power transmission transmitter circuit.

7. A communication method of a wireless power transmission receiving circuit comprising:

acquiring a current power level of the wireless power transmission receiving circuit; and selecting one modulation sub-circuit or combination of a plurality of modulation sub-circuits corresponding to a power level of the wireless power transmission receiving circuit for operation based on the current power level of the wireless power transmission receiving circuit.

8. The communication method according to claim 7, wherein the wireless power transmission receiving circuit comprises a first modulation sub-circuit and a second modulation sub-circuit, the first modulation sub-circuit is configured to receive a first drive signal, and the second modulation sub-circuit is configured to receive a second drive signal.

9. The communication method according to claim 8, wherein the selecting of the one modulation sub-circuit or combination of a plurality of modulation sub-circuits corresponding to the power level of the wireless power transmission receiving circuit for operation based on the current power level of the wireless power transmission receiving circuit, comprises:

determining the current power level of the wireless power transmission receiving circuit being a first level, wherein the first drive signal is configured to drive the first modulation sub-circuit to operate.

10. The communication method according to claim 8, wherein the selecting one modulation sub-circuit or combination of a plurality of modulation sub-circuits corresponding to the power level of the wireless power transmission receiving circuit for operation based on the current power level of the wireless power transmission receiving circuit, comprises:

determining the current power level of the wireless power transmission receiving circuit as a second level, wherein the second drive signal is configured to drive the second modulation sub-circuit to operate.

11. The communication method according to claim 8, wherein the selecting one modulation sub-circuit or combination of a plurality of modulation sub-circuits corresponding to the power level of the wireless power transmission receiving circuit for operation based on the current power level of the wireless power transmission receiving circuit, comprises:

determining the current power level of the wireless power transmission receiving circuit as a third level, wherein the first drive signal is configured to drive the first modulation sub-circuit to operate and the second drive signal is configured to drive the second modulation sub-circuit to operate.

* * * * *